US010314015B2

(12) United States Patent
Shan et al.

(10) Patent No.: US 10,314,015 B2
(45) Date of Patent: Jun. 4, 2019

(54) REPORTING OF USER PLAN CONGESTION

(71) Applicant: INTEL CORPORATION, Santa Clara, CA (US)

(72) Inventors: Chang Hong Shan, Shanghai (CN); Eric Slow, Beaverton, OR (US); Muthaiah Venkatachalam, Beaverton, OR (US); Puneet Jain, Hillsboro, OR (US); Alexandre Stojanovski, Paris (FR)

(73) Assignee: INTEL CORPORATION, Santa Clara, CA (US)

( * ) Notice: Subject to any disclaimer, the term of this patent is extended or adjusted under 35 U.S.C. 154(b) by 5 days.

(21) Appl. No.: 14/125,324

(22) PCT Filed: Jun. 27, 2013

(86) PCT No.: PCT/US2013/048344
§ 371 (c)(1),
(2) Date: Dec. 11, 2013

(87) PCT Pub. No.: WO2014/065898
PCT Pub. Date: May 1, 2014

(65) Prior Publication Data
US 2015/0103664 A1 Apr. 16, 2015

Related U.S. Application Data

(60) Provisional application No. 61/719,241, filed on Oct. 26, 2012.

(51) Int. Cl.
*H04W 72/04* (2009.01)
*H04W 24/10* (2009.01)
(Continued)

(52) U.S. Cl.
CPC ....... *H04W 72/0413* (2013.01); *H04J 3/1694* (2013.01); *H04L 1/1671* (2013.01);
(Continued)

(58) Field of Classification Search
CPC ..... H04L 12/5691; H04L 47/10; H04L 47/12; H04L 47/125
See application file for complete search history.

(56) References Cited

U.S. PATENT DOCUMENTS

2011/0096665 A1* 4/2011 McCann ................. H04L 47/10
370/235
2011/0176414 A1* 7/2011 De Franca Lima .... H04L 47/12
370/230
(Continued)

FOREIGN PATENT DOCUMENTS

| CN | 102165740 A | 8/2011 |
|---|---|---|
| EP | 1 965 579 A1 | 9/2008 |

(Continued)

OTHER PUBLICATIONS

International Search Report and Written Opinion received for PCT Patent Application No. PCT/US2013/048344, dated Oct. 23, 2013, 11 pages.

(Continued)

*Primary Examiner* — Bo Hui A Zhu
(74) *Attorney, Agent, or Firm* — Thorpe North & Western

(57) ABSTRACT

Technology for a radio access network (RAN) node that is operable to report user plane congestion (UPCON) is disclosed. The RAN node may include computer circuitry configured to receive, from a Core Network (CN), an information element (IE) including UPCON related Policy and Control Charging (PCC) information. The RAN node may identify a location of an UPCON event, at the RAN node, based on an UPCON event trigger included in the
(Continued)

UPCON related PCC information. The RAN node may report Radio Access Network Congestion Information (RCI) about the UPCON event to one or more network elements in the CN.

14 Claims, 18 Drawing Sheets

(51) Int. Cl.
| | |
|---|---|
| H04W 28/02 | (2009.01) |
| H04J 3/16 | (2006.01) |
| H04L 1/16 | (2006.01) |
| H04L 1/18 | (2006.01) |
| H04L 5/14 | (2006.01) |
| H04L 12/14 | (2006.01) |
| H04L 12/801 | (2013.01) |
| H04L 12/811 | (2013.01) |

(52) U.S. Cl.
CPC .............. *H04L 1/1861* (2013.01); *H04L 5/14* (2013.01); *H04L 12/1407* (2013.01); *H04L 47/12* (2013.01); *H04W 24/10* (2013.01); *H04W 28/0289* (2013.01); *H04W 72/042* (2013.01); *H04W 72/0446* (2013.01); *H04L 47/38* (2013.01); *Y02D 70/122* (2018.01); *Y02D 70/126* (2018.01); *Y02D 70/14* (2018.01)

(56) References Cited

U.S. PATENT DOCUMENTS

| | | | |
|---|---|---|---|
| 2011/0255410 A1* | 10/2011 | Yamen | H04L 12/5691 370/237 |
| 2012/0039175 A1* | 2/2012 | Sridhar | H04L 47/125 370/236 |
| 2012/0201137 A1* | 8/2012 | Le Faucheur | H04W 28/0226 370/235 |
| 2012/0257503 A1* | 10/2012 | Vrbaski | H04W 28/0205 370/235 |
| 2013/0201824 A1* | 8/2013 | Venkatachalam | H04W 28/12 370/230 |

FOREIGN PATENT DOCUMENTS

| | | |
|---|---|---|
| EP | 2 512 176 A1 | 10/2012 |
| KR | 10-2012-0052907 A | 5/2012 |
| WO | WO 2011/139305 A1 | 11/2011 |
| WO | 2012/062348 A1 | 5/2012 |

OTHER PUBLICATIONS

3GPP TS 23.401, "General Packet Radio Service (GPRS) Enhancements for Evolved Universal Terrestrial Radio Access Network", Technical Specification, 3rd Generation Partnership Project, Technical Specification Group Services and System Aspects, V11.3.0, Release 11, Sep. 2012, pp. 1-283.

3GPP TS 23.203, "Policy and Charging Control Architecture", Technical Specification, 3rd Generation Partnership Project, Technical Specification Group Services and System Aspects, V11.7.0, Release 11, Sep. 2012, pp. 1-178.

* cited by examiner

REPORTING OF USER PLAN CONGESTION

RELATED APPLICATIONS

The present application claims priority to U.S. Provisional Patent Application No. 61/719,241, filed Oct. 26, 2012, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single Lanier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure: and, wherein.

Figure 1A:
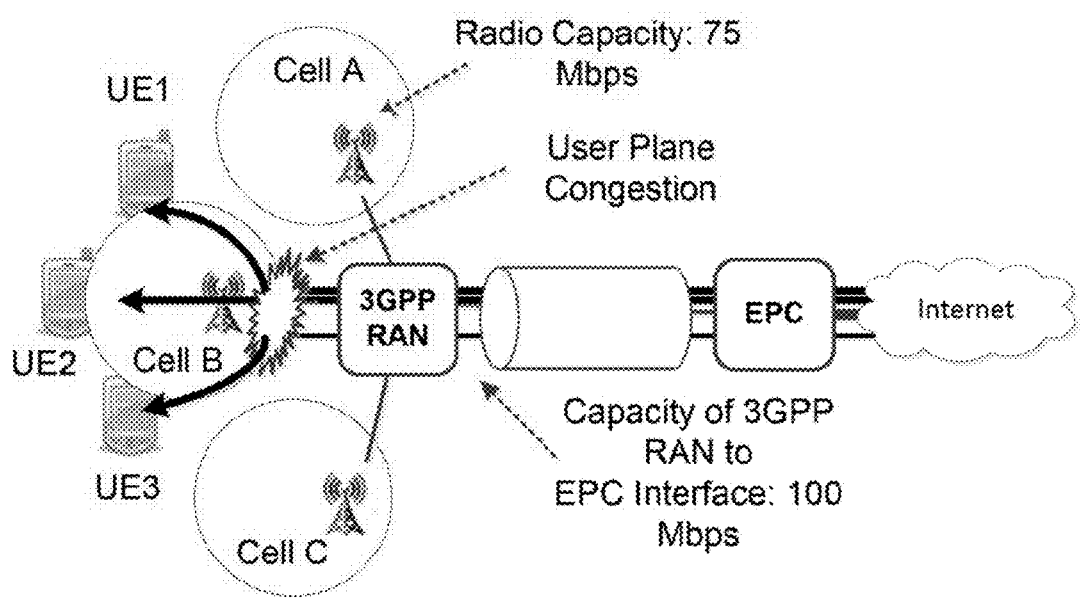
FIG. 1A illustrates user plane congestion (UPCON) due to exceeding a radio capacity of a cell in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not hunted to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in farther detail later. This initial summary is intended to aid readers in understanding the technology more quickly but is not intended to identify key features or essential features of the technology nor is it intended to limit the scope of the claimed subject matter.

In recent years, mobile operators have seen significant increases in user traffic data. Although the data capacity of networks has increased, the observed increase in user traffic data continues to outpace the growth of network data capacity. In general, Radio Access Network (RAN) user plane congestion (UPCON) may occur when the demand for RAN resources (i.e., for the transfer of user data exceeds the capacity of the RAN resources. As a result, users may receive the data with a reduced quality of service (QoS). Thus, the increase of network congestion may degrade the user service experience. In general, user plane congestion (i.e., data plane congestion), or UPCON, may be triggered under two scenarios: (1) User plane congestion due to full use of cell capacity; and (2) User plane congestion due to limitations of the 3GPP RAN to Evolved Packet Core (EPC) interface.

FIG. 1A illustrates an example of user plane congestion (UPCON) due to full use of cell capacity. The Third Generation Partnership Project (3GPP) Radio Access Network (RAN) node may be in communication with an evolved packet core (EPC). The EPC may be included in the core network (CN). In one example, the capacity of the 3GPP RAN to EPC interface may be 100 megabits per second (Mbps). The 3GPP RAN node may communicate user data to a plurality of user devices or user equipments (UEs) located within a cell. UPCON may occur when the traffic volume in Cell B exceeds the capacity of the cell. For example, the plurality of UEs in the cell may generate user plane traffic that equals the cell capacity. When an additional or an existing UE attempts to generate additional user plane traffic in the cell, congestion may occur in that cell. As an example, the 3GPP RAN may communicate user data to Cells A, B, and C. The radio capacity may be 75 Mbps for Cells A, B, and C. UPCON may occur when the traffic volume in Cell B exceeds the capacity of the cell. (e.g., 75 Mbps).

Figure 1B:
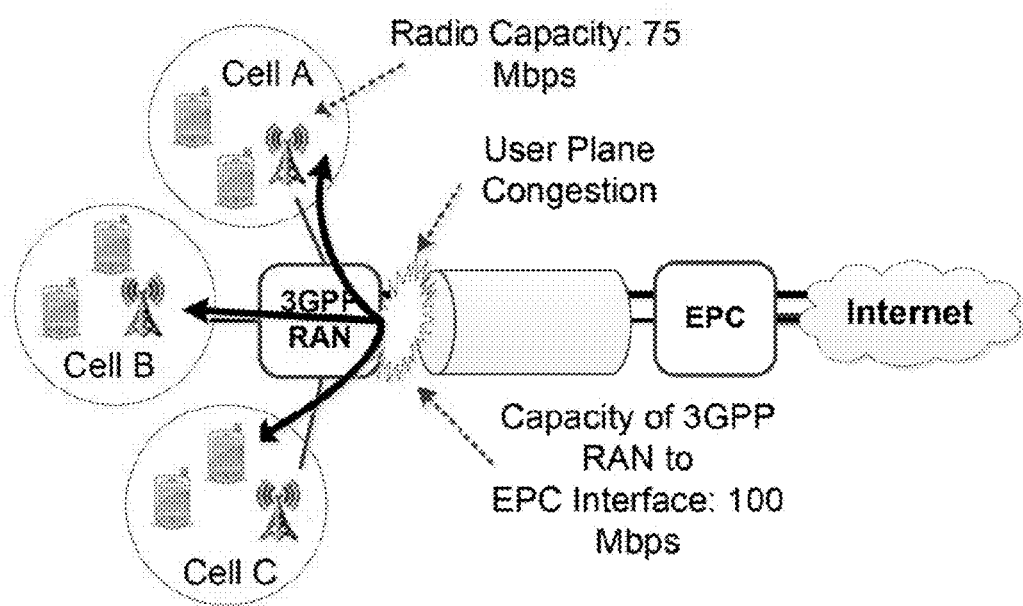
FIG. 1B illustrates UPCON due to a capacity limitation of a Third Generation Partnership Project (3GPP) Radio Access Network (RAN) to Evolved Packet Core (EPC) interface in accordance with an example.

FIG. 1B illustrates an example of UPCON due to a capacity limitation of a Third Generation Partnership Project (3GPP) Radio Access Network (RAN) to Evolved Packet Core (EPC) interface. The 3GPP RAN may be in communication with the EPC. The EPC may be included in the Core Network (CN). In one example, the capacity of the 3GPP RAN to EPC interface may be 100 megabits per second (Mbps). The 3GPP RAN may communicate user data to Cells A, B and C, wherein each of the cells may contain a plurality of user devices or UEs. The radio capacity for each cell may be 75 Mbps. When the volume of the user plane data communicated to the plurality of UEs in Cells A, B, and C is greater than the capacity of the 3GPP RAN to EPC interface, UPCON may occur at the 3GPP RAN. For example, the volume of the user plane data may be greater than the capacity of the 3GPP RAN to EPC interface (e.g., 100 Mbps). As a result, all of the UEs in Cells A, B, and C may experience excessive data rate reduction or service denial. Even though each cell (e.g., Cells A, B, and C) may have the necessary capacity to support the plurality of UEs being served within that cell, the capacity limitations of the 3GPP RAN to EPC interface may adversely impact one or more UEs in Cells A, B, and C. As a result, the UPCON at the 3GPP RAN to EPC interface may prevent the plurality of UEs from sending user data to or receiving user data from the EPC.

The 3GPP Technical Specification (TS) 23.401 Section 4.3.7.5 (Release 12) includes mechanisms for the packet data network gateway (PDN-GW) to avoid and handle cell overload situations. For example, the PDN-GW may reject packet data network (PDN) connection setup requests from the UEs that arrive at the PDN Gateway (P-GW) via the Mobility Management Entity (MME). The UEs may then be notified that the new PDN connection cannot be established with the network. However, the PDN connection setup requests may still be sent to a presumably overloaded P-GW. Furthermore, there may be a higher latency for the UEs to be notified that the PDN connections cannot be established via the P-GW because the PDN connection setup requests travel from an evolved node B (eNB) through the MME to the P-GW, and then back through the MME and the eNB before reaching the UEs. In addition, an overload situation in the serving gateway (S-GW) may also impact UE throughput, thereby resulting in a negative user experience.

Thus, in order to mitigate the effect of UPCON, the core network (CN) may provision UPCON detection rules to the access network (e.g., the RAN). The UPCON detection rules may include UPCON event triggers. As a result, the access network may detect UPCON conditions based on the UPCON event triggers that are provisioned by the CN. The access network may report congestion conditions to the CN. The CN may notify an application server (AS) to perform one or more actions that reduce the congestion on the user plane (i.e., data plane).

The Core Network (CN) may communicate Policy and Control Charging (PCC) information related to user plane congestion (i.e., UPCON related PCC information) to the RAN. The CN may provision the UPCON related PCC information to the RAN in order to deal with UPCON situations more effectively. In other words, the CN may deliver or provide the UPCON related PCC information to the RAN. In particular, the UPCON related PCC information may be delivered to a RAN node, an evolved node B (eNB), a Radio Network Controller (RNC), or a Base Station System (BSS).

The UPCON related PCC information may include an UPCON event, such as an indication of RAN user plane congestion. In addition, the UPCON event may include an indication that a RAN user plane congestion reporting feature has been enabled or started for a portion (or all) of the evolved packet system (EPS) bearers of the LTE. The UPCON related PCC information may include one or more UPCON event triggers. The UPCON event trigger may indicate that the location of the UPCON occurs at one of: a radio uplink, a radio downlink, a network uplink, a network downlink, or a RAN node processing capability.

The UPCON related PCC information may include the granularity for UPCON event reporting by the eNB. For example, the UPCON related PCC information may indicate that the eNB is to report the UPCON event per user equipment (UE), per access point name (APN), or per evolved packet system (EPS) bearer. The UPCON related PCC information may include related identifiers (e.g., APN) for the impacted APN if the UPCON event granularity is per APN. In addition, the UPCON related PCC information may include related identifiers (e.g., EPS bearer identifiers) for the impacted EPS bearer if the UPCON event granularity is per EPS bearer. Furthermore, the UPCON related PCC information may include a suggested maximum bitrate for congestion and non-congestion conditions, as well as a congestion duration after which the UPCON event should be reported at the eNB.

Once one of the UPCON event triggers is matched, the eNB ma report the UPCON event to one or more CN elements, such as the MME, the S-GW, the P-GW, etc. The eNB may report the UPCON event to the CN elements either directly or indirectly. As will be discussed in greater detail below, the eNB may report RAN congestion information (RCI) along with the UPCON event to the CN elements.

In one configuration, the UPCON event trigger may be provisioned for UE based granularity, APN based granularity, or EPS bearer based granularity. In other words, when an UPCON event is detected based on the UPCON event trigger, the eNB may report the UPCON event per UE, per APN, or per bearer. Thus, the specific UEs, APNs, or bearers that are experiencing UPCON may be reported to the CN elements. The granularity of the UPCON report (e.g., per UE, per APN, per bearer) may be determined by the policy of operators and subscriber's profile.

In addition, the CN may communicate (via the UPCON related PCC information) a suggested maximum bitrate (MBR) information element (IE) included in each message for the per LTE case, the per APN case, and the per EPS bearer case. The IE may include a congested UE aggregated maximum bitrate (UE-AMBR) and an uncongested UE-AMBR for the per LTE case, a congested APN-AMBR and an uncongested APN-AMBR for the per APN case, or a congested bearer maximum bitrate (MBMR) and an uncongested BMBR for the per bearer case. In other words, the CN may communicate the suggested maximum bitrates for congestion and non-congestion conditions to the eNB for the desired granularity level.

As will be discussed in greater detail below, the CN may communicate the UPCON related PCC information (including the UPCON event triggers) to the RAN (e.g., the eNB, the RCN, the BSS), in an evolved packet system (EPS), based on at least one of: an attach procedure, a dedicated bearer activation procedure, a dedicated bearer modification procedure, or a UE requested PDN connectivity procedure.

In addition, the UPCON event trigger for UE based granularity reporting may be provisioned during the attach procedure. The UPCON event trigger for APN based granularity reporting may be provisioned during the attach procedure or the UE requested PDN connectivity procedure. The UPCON event trigger for bearer based granularity reporting may be provisioned during a default procedure, the dedicated bearer activation procedure, or the dedicated bearer modification procedure.

In addition, the eNB may receive the UPCON related PCC information through a direct communication between a Policy and Charging Enforcement Function (PCEF) and a Policy and Charging Rules Function (PCRF). The PCRF is a functional element that may provide policy control and flow-based charging control decisions. The PCEF is a functional element that may be implemented in the serving gateway (S-GW) in order to enforce the policies on behalf of the PCRF. In particular, the PCEF may be enforced on the eNB. The PCRF and the PCEF may communicate with each other via a Gx interface interaction. The Gx interface may include an IPCAN session establishment or an IPCAN session modification. As a result. UPCON related PCC information (including the UPCON event triggers) may be directly communicated between the eNB/PCEF and the PCRF.

Figure 2A:
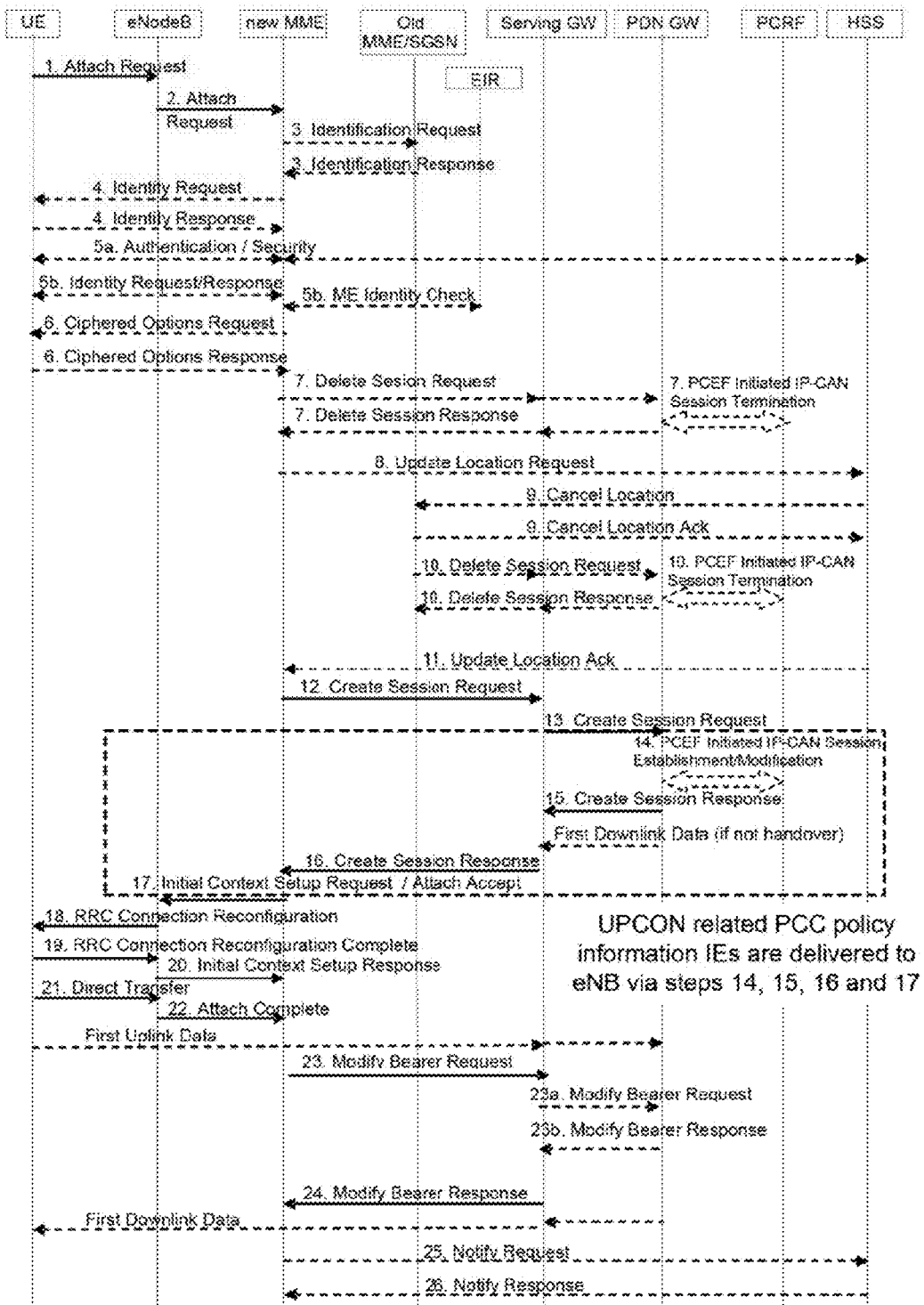
FIG. 2A illustrates the communication of UPCON related Policy and Control Charging (PCC) information, from a Policy and Charging Rules Function (PCRF) to an evolved node B (eNB), during an attach procedure in accordance with an example.

FIG. 2A illustrates the communication of UPCON related Policy and Control Charging (PCC) information, from a Policy and Charging Rules Function (PCRF) to an evolved node B (eNB), during an attach procedure. The attach procedure is further described in 3GPP Technical Specification (TS) 23.401 Section 5.3.2 (Release 12). During the attach procedure, the UE may register with the network in order to receive services (e.g., user data) from the network elements. In particular, the PCRF may communicate the UPCON related PCC information to the eNB during steps 14, 15, 16, and 17 of the attach procedure.

At step 1, the UE may initiate the attach procedure by communicating, to the eNB, an Attach Request message. At step 2, the eNB may communicate the Attach Request message a new Mobility Management Entity (MME). At step 3, the new MME may communicate an Identification Request message (along with the Attach Request message) to an old MME or a Serving Gateway General Packet Radio Service (GPRS) Support Node (SGSN) to request a user identity, such as an International Mobile Subscriber Identity (IMSI). The old MME may verify the Attach Request message and then respond with the IMSI. At step 4, if the UE is unknown to both the old MME/SGSN and the new MME, then the new MME may communicate an Identity Request message to the UE in order to request the IMSI. The UE may respond with the IMSI. At steps 5a and 5b, authentication and security messages may be communicated between the UE and the new MME. At step 6, Ciphered Options messages may be communicated between the UE and the new MME in response to a Ciphered Options Transfer Flag being set in the Attach Request message.

At step 7, Delete Session Request messages may be communicated between the new MME and the serving gateway (S-GW). At step 8, if the new MME has changed since the last detach, then the new MME may communicate an Update Location Request message to the Home Subscriber Server (HSS). At step 9, the HSS may communicate a Cancel Location message to the old MME. The old MME may communicate a Cancel Location Acknowledgement message to the HSS in response to the Cancel Location message. At step 10, if there are active bearer contexts in the old MME for the UE, then the old MME may delete the bearer contexts by communicating a Delete Session Request message to the S-GW and/or the packet data network (PDN) GW. At step 11, the HSS may acknowledge the Update Location Request message by communicating an Update Location Acknowledgement message to the new MME. At step 12, the new MME may communicate a Create Session Request message to a selected S-GW. At step 13, the S-GW may communicate a Create Session Request message to the PDN-GW As previously explained, the PCRF may communicate the UPCON related PCC information to the eNB during steps 14, 15, 16, and 17 of the attach procedure. At step 14, the PDN-GW may perform an Internet Protocol Connectivity Access Network UP-CAN) Session Establishment Procedure, thereby obtaining the default PCC rules for the UE. In addition, the PDN-GW may execute a PCEF-initiated IP-CAN Session Management procedure with the PCRF to report the new IP-CAN type. Depending on the active PCC rules, the establishment of dedicated bearers for the UE may be required. At step 15, the PDN-GW may communicate a Create Session Response message to the S-GW. At step 16, the S-GW may communicate a Create Session Response message to the new MME. At step 17, the new MME may communicate an Initial Context Setup Request message to the eNB, which includes an Attach Accept message.

At step 18, the eNB may communicate a Radio Resource Control (RRC) Connection Reconfiguration message to the UE. The RRC Connection Reconfiguration Message may include an EPS Radio Bearer Identity to the UE and an Attach Accept message. At step 19, the UE may communicate the RRC Connection Reconfiguration Complete message to the eNB. At step 20, the eNB may communicate an Initial Context Response message to the new MME. At step 21, the UE may communicate a Direct Transfer message to the eNB, which includes the Attach Complete message. At step 22, the eNB may communicate the Attach Complete message to the new MME. At step 23, the new MME may communicate a Modify Bearer Request message to the S-GW. At step 24, the S-GW may communicate a Modify Bearer Response message to the new MME. At step 25, the new MME may communicate a Notify Request message to the HSS. At step 26, the HSS may communicate a Notify Response to the MME.

Figure 2B:
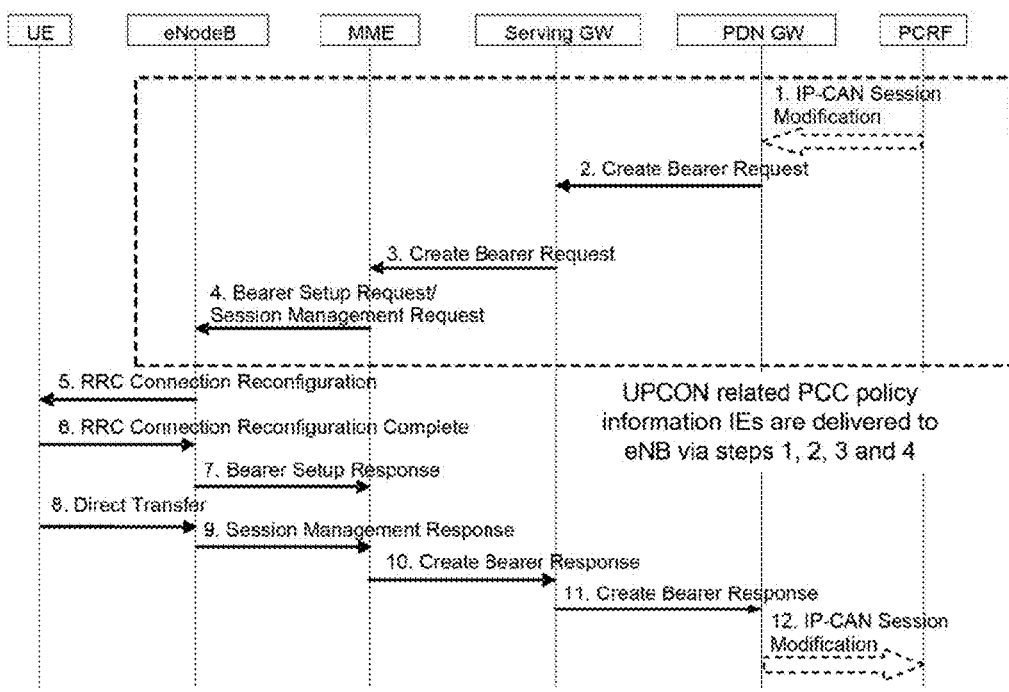
FIG. 2B illustrates the communication of UPCON related PCC information, from a PCRF to an eNB, during a dedicated bearer activation procedure in accordance with an example.

FIG. 2B illustrates the communication of UPCON related PCC information, from a PCRF to an eNB, during as dedicated bearer activation procedure. The dedicated hearer activation procedure is further described in 3GPP Technical Specification (TS) 23.401 Section 5.4.1 (Release 12). In particular, the PCRF may communicate the UPCON related PCC information to the eNB during steps 1, 2, 3, and 4 of the dedicated bearer activation procedure.

At step 1, if dynamic PCC is deployed, the PCRF may communicate a PCC decision provision (QoS policy) message to the PDN-GW. The PCC QoS policy message may correspond to the initial steps of the PCRF-Initiated IP-CAN Session Modification procedure or to the PCRF response in the PCEF-Initiated IP-CAN Session Modification procedure as defined in 3GPP TS 23.203[6]. At step 2, the PDN-GW may communicate a Create Bearer Request message to the S-GW. At step 3, the S-GW may communicate the Create Bearer Request message to the MME. At step 4, the MME may communicate a Session Management Request message and a Bearer Setup Request message to the eNB. During steps 1 to 4 of the dedicated bearer activation procedure, the PCRF may communicate the UPCON related PCC information to the eNB.

At step 5, the eNB may communicate a RRC Connection Reconfiguration message to the UE. At step 6, the UE may communicate a RRC Connection Reconfiguration Complete message to the eNB. At step 7, the eNB may acknowledge the bearer activation to the MME by communicating a Bearer Setup Response message to the MIME. At step 8, the UE may communicate a Direct Transfer (Session Management Response) message to the eNB. At step 9, the UE may communicate the Session Management Response message to the MME. At step 10, the MIME may acknowledge the bearer activation to the S-GW by communicating a Create Bearer Response message to the S-GW. At step 11, the S-GW may acknowledge the bearer activation to the PDN-GW by communicating the Create Bearer Response message to the PDN-GW. At step 12, the PCRF-Initiated IP CAN Session Modification procedure or the PCEF initiated IP-CAN Session Modification procedure may be completed, as defined in 3GPP TS 23.203[6].

Figure 2C:
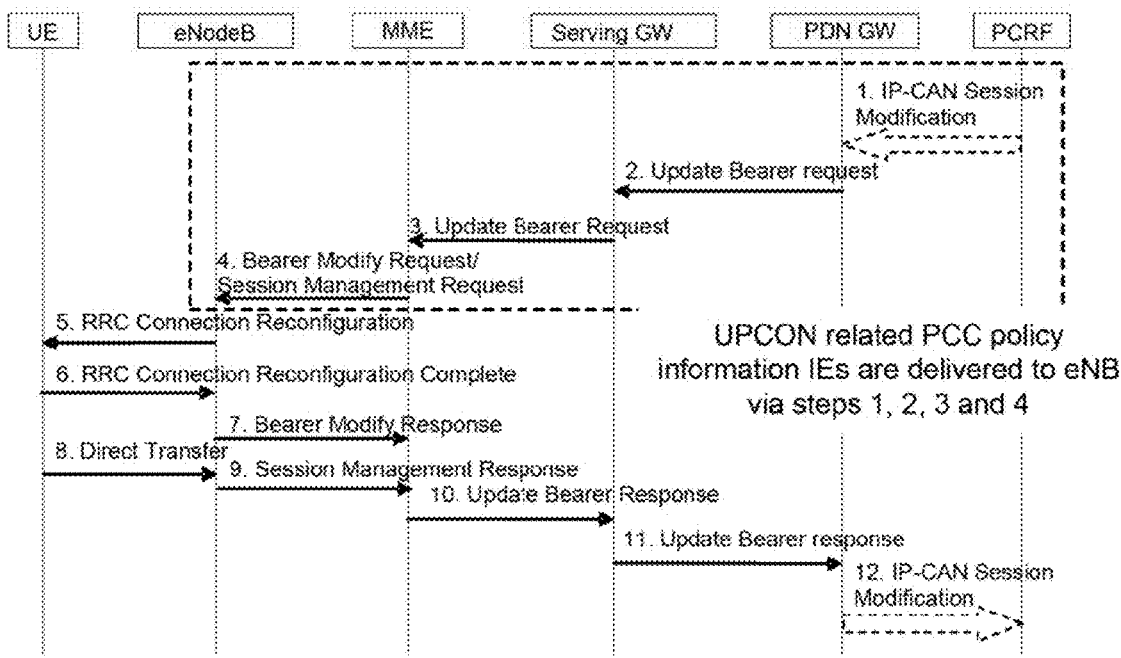
FIG. 2C illustrates the communication of UPCON related PCC information, from a PCRF to an eNB, during a dedicated bearer modification procedure in accordance with an example.

FIG. 2C illustrates the communication of UPCON related PCC information, from a PCRF to an eNB, during a dedicated bearer modification procedure. The dedicated bearer modification procedure may be further described in 3GPP Technical Specification (TS) 23.401 Section 5.4.2 (Release 12). In particular, the PCRF may communicate the UPCON related PCC information to the eNB during steps 1, 2, 3, and 4 of the dedicated bearer modification procedure.

At step 1, if dynamic PCC is deployed, the PCRF may communicate a PCC decision provision (QoS policy) message to the PDN-GW. The PCC QoS policy message may correspond to the initial steps of the PCRF-Initiated IP-CAN Session Modification procedure or to the PCRF response in the PCEF-Initiated IP-CAN Session Modification procedure as defined in 3GPP TS 23.203[6]. At step 2, the PDN-GW may communicate an Update Bearer Request message to the S-GW. At step 3, the S-GW may communicate the Update Bearer Request message to the MME. At step 4, the MME may communicate a Session Management Request message and a Bearer Modify Request message to the eNB. During steps 1 to 4 of the dedicated bearer modification procedure, the PCRF may communicate the UPCON related PCC information to the eNB.

At step 5, the eNB may communicate a RRC Connection Reconfiguration message to the UE. At step 6, the UE may communicate a RRC Connection Reconfiguration Complete message to the eNB. At step 7, the eNB may acknowledge the bearer modification to the MME by communicating a Bearer Modify Response message to the MME. At step 8, the UE may communicate a Direct Transfer (Session Management Response) message to the eNB. At step 9, the UE may communicate the Session Management Response message to the MME. At step 10, the MME may acknowledge the bearer activation to the S-GW by communicating a Update Bearer Response message to the S-GW. At step 11, the S-GW may acknowledge the bearer activation to the PDN-GW by communicating the Update Bearer Response message to the PDN-GW. At step 12, the PCRF-Initiated IP CAN Session Modification procedure or the PCEF initiated IP-CAN Session Modification procedure may be completed, as defined in 3GPP TS 23.203[6].

Figure 2D:
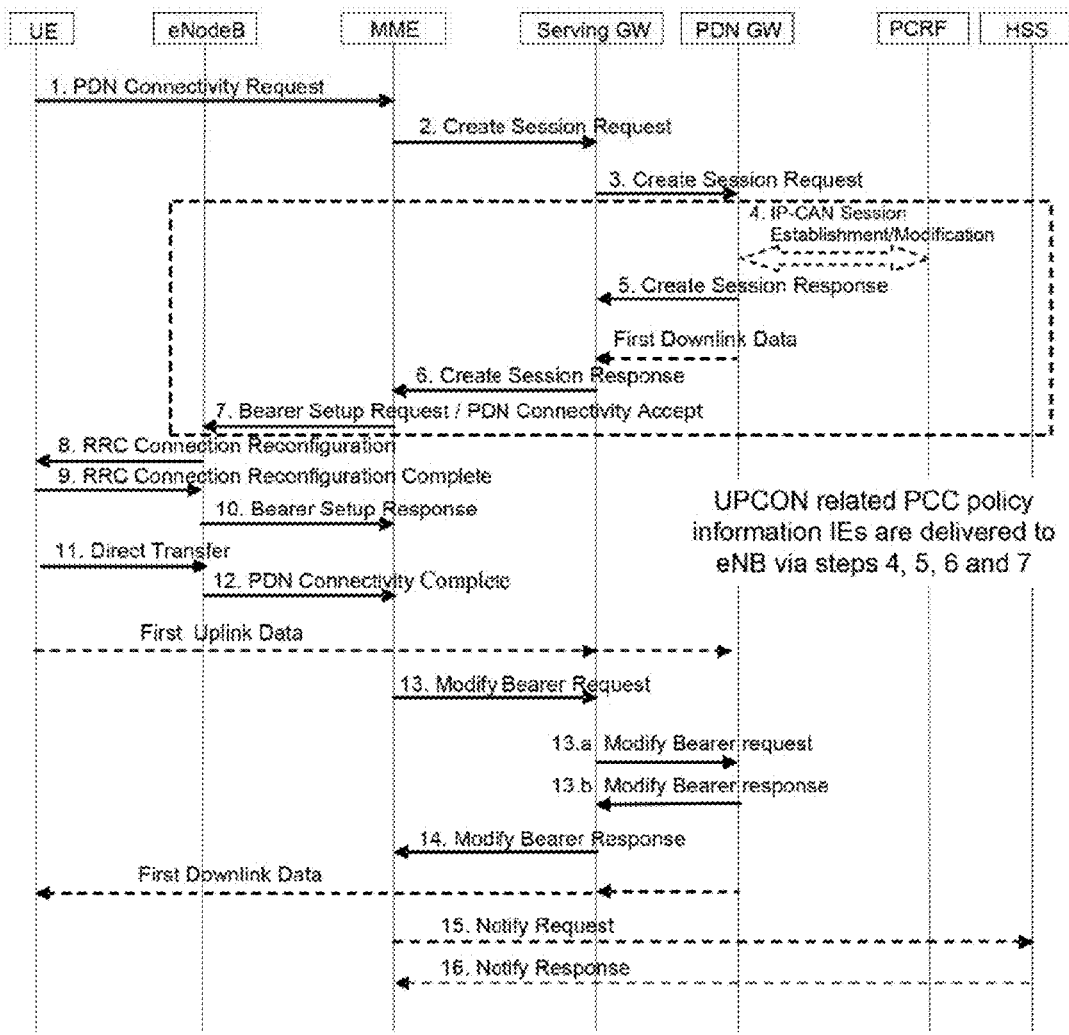
FIG. 2D illustrates the communication of UPCON related PCC information, from a PCRF to an eNB, during a user equipment (UE) requested packet data network (PDN) connectivity procedure in accordance with an example.

FIG. 2D illustrates the communication of UPCON related PCC information, from a PCRF to an eNB, during a user equipment (UE) requested packet data network (PDN) connectivity procedure. The UE requested PDN connectivity procedure may be further described in 3GPP Technical Specification (TS) 23.401 Section 5.10.2 (Release 12). In particular, the PCRF may communicate the UPCON related PCC information to the eNB during steps 4, 5, 6, and 7 of the UE requested PDN connectivity procedure.

At step 1, the UE may initiate the UE requested PDN procedure by communicating a PDN Connectivity Request message to the MME. At step 2, the MME may communicate a Create Session Request message to the S-GW. At step 3, the S-GW may communicate the Create Session Request message to the PDN-GW.

At step 4, the PDN-GW may employ an IP-CAN Session Establishment procedure to obtain the default PCC rules for the UE. In addition, the PDN-GW may execute an IP-CAN Session Modification procedure with the PCRF, as defined in TS 23.203[6]. At step 5, the PDN-GW may communicate a Create Session Response message to the S-GW. At step 6, the S-GW may communicate the Create Session Response message to the MME. At step 7, the MME may communicate a Bearer Setup Request message and a PDN Connectivity Accept message to the eNB. During steps 4 to 7 of the UE requested PDN connectivity procedure, the PCRF may communicate the UPCON related PCC information to the eNB.

At step 8, the eNB may communicate a RRC Connection Reconfiguration message to the UE. At step 9, the UE may communicate a RRC Connection Reconfiguration Complete message to the eNB. At step 10, the eNB may communicate a Bearer Setup Response message to the MME. At step 11, the UE may communicate a Direct Transfer (PDN Connectivity Complete) message to the MME. At step 12, the eNB may communicate the PDN Connectivity Complete message to the MIME. At step 13, the MME may communicate a Modify Bearer Request message to the S-GW. At step 14, the S-GW may acknowledge the Modify Bearer Request message by communicating a Modify Bearer Response message to the MME. At step 15, the MME may communicate a Notify Request message to the HSS. At step 16, the HHS may communicate a Notify Response message to the MME.

In one configuration, the UPCON related PCC information may be communicated to a radio access network (RAN) node during a packet data protocol (PDP) context activation procedure or a PDP context modification procedure in a 2G/3G system. The RAN node may include a Radio Network Controller (RNC) or a Base Station System (BSS). In particular, the UPCON related PCC information may be delivered to the RAN node for a Universal Terrestrial Radio Access Network (UTRAN) or as Global System for Mobile Communications (GSM) Enhanced Data rates for GSM Evolution (EDGE) Radio Access Network (GERAN) access case (i.e., a UTRAN/GERAN access case).

Figure 3A:
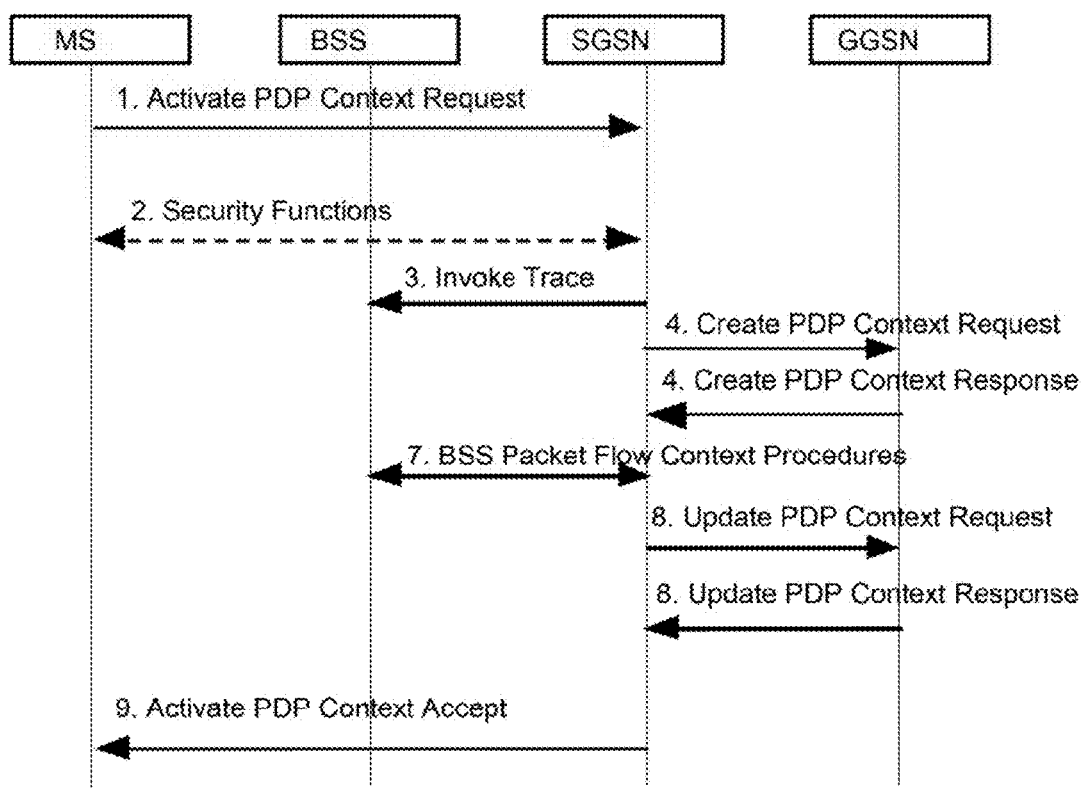
FIGS. 3A and 3B illustrate the communication of UPCON related PCC information, from a Gateway General Packet Radio Service (GPRS) Support Node (GGSN) to a base station system (BSS) or a radio access network (RAN) node, during a packet data protocol (PDP) context activation procedure in accordance with an example.
Figure 3B:
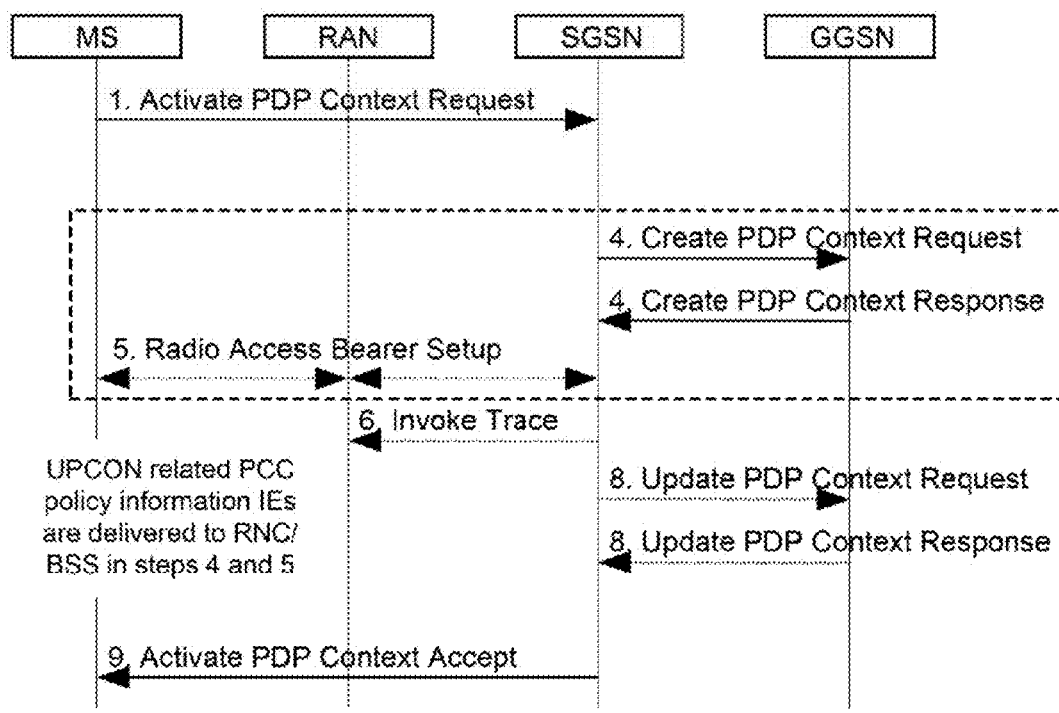

FIGS. 3A and 3B illustrate the communication of UPCON related PCC information, from a Gateway General Packet Radio Service (GPRS) Support Node (CSN) to a Base Station System (BSS) or a radio access network (RAN) node, during a Packet Data Protocol (PDP) Context Activation Procedure. The PDP Context Activation Procedure for A/Gb mode (FIG. 3A) and the PDP Context Activation Procedure for Iu mode (FIG 3B) is further described in 3GPP Technical Specification (TS) 23.060 Section 9.2.2 (Release 11). In particular the GGSN may communicate the UPCON related PCC information to the RAN node or the BSS during the PDP Context Activation procedure for the UTRAN/GERAN access case.

According to FIG. 3A, the UPCON related PCC information may be communicated to the Base Station System (BSS) during steps 5 and 6. At step 1, the mobile station (MS) may communicate an Activate PDP Context Request message to the SGSN. At step 2, security functions may be executed between the MS and the SGSN. At step 3, the SGSN may communicate an Invoke Trace message to the Base Station System (BSS). At step 4, the SGSN may validate the Activate PDP Context Request message provided by the MS. The SGSN may communicate a Create PDP Context Request message to the GGSN. The GGSN may communicate a Create PDP Context Response message to the SGSN. In addition, the GGSN may communicate the UPCON related PCC information to the SGSN. At step 5, for Iu mode. Radio Access Bearer (RAB) Setup may occur by using a RAB Assignment procedure. At step 6, for Iu mode, the SGSN may send an Invoke Trace message to the RAN node. At step 7. BSS packet flow context procedures may be executed between the SGSN and the BSS. In addition, the SGSN may communicate the UPCON related PCC information to the BSS. At step 8, the SGSN may communicate an Update PDP Context Request message to the GGSN that includes QoS attributes. The GGSN may communicate an Update PDP Context Response to the SGSN to confirm the new QoS attributes. At step 9, the SGSN may communicate an Activate PDP Context Accept message to the MS.

According to FIG. 3B, the UPCON related PCC information may be communicated to the Radio Access Network (RAN) node during steps 4 and 5. At step 1, the mobile station (MS) may communicate an Activate PDP Context Request message to the SGSN. At step 4, the SGSN may validate the Activate PDP Context Request message provided by the MS. The SGSN may communicate a Create PDP Context Request message to the GGSN. The GGSN may communicate a Create PDP Context Response message to the SGSN. In addition, the GGSN may communicate the UPCON related PCC information to the SGSN. At step 5, Radio Access Bearer (RAB) Setup may occur by using a RAB Assignment procedure. In particular, RAB Setup may occur between the RAN node and the SGSN, as well as between the MS and the RAN node. When the RAB Setup occurs between the SGSN and the RAN node, the UPCON related PCC information may be communicated to the RAN node. At step 6, the SGSN may send an Invoke Trace message to the RAN node. At step 8, the SGSN may communicate an Update PDP Context Request message to the GGSN that includes QoS attributes. The GGSN may communicate an Update PDP Context Response to the SGSN to confirm the new QoS attributes. At step 9, the SGSN may communicate an Activate PDP Context Accept message to the MS.

Figure 3C:
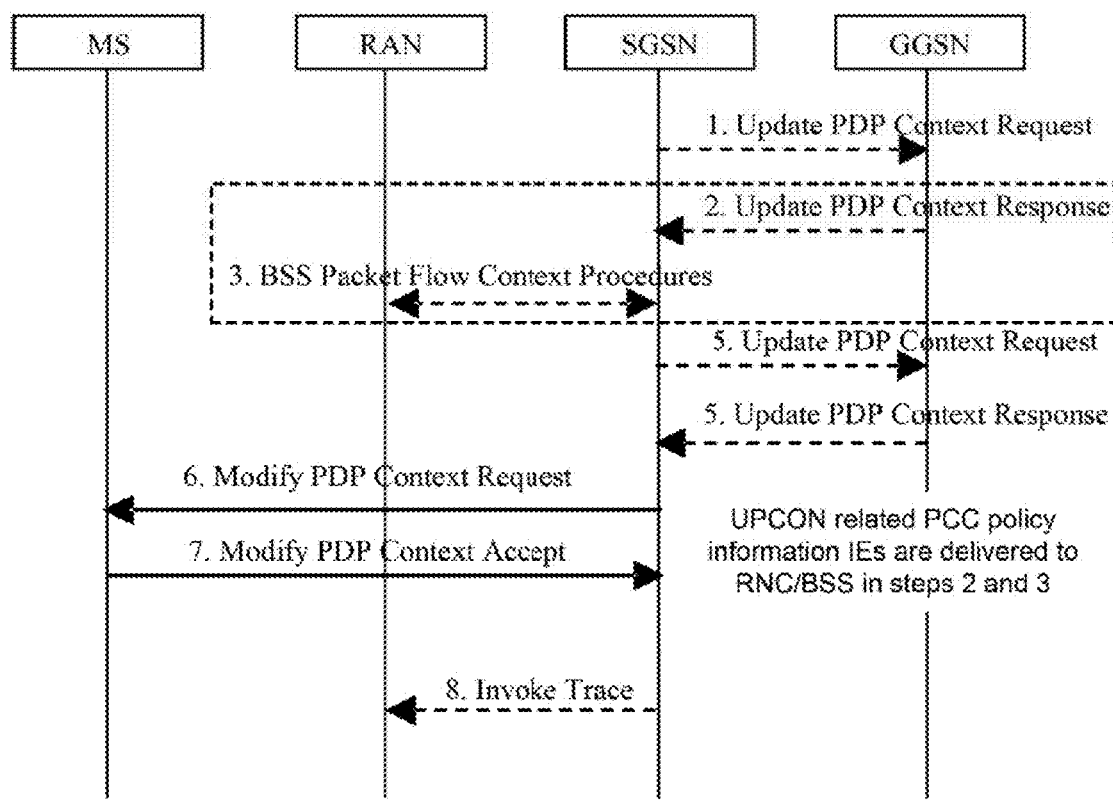
FIGS. 3C and 3D illustrate the communication of UPCON related PCC information, from a GGSN to a RAN node, during a PDP context modification procedure in accordance with an example.
Figure 3D:
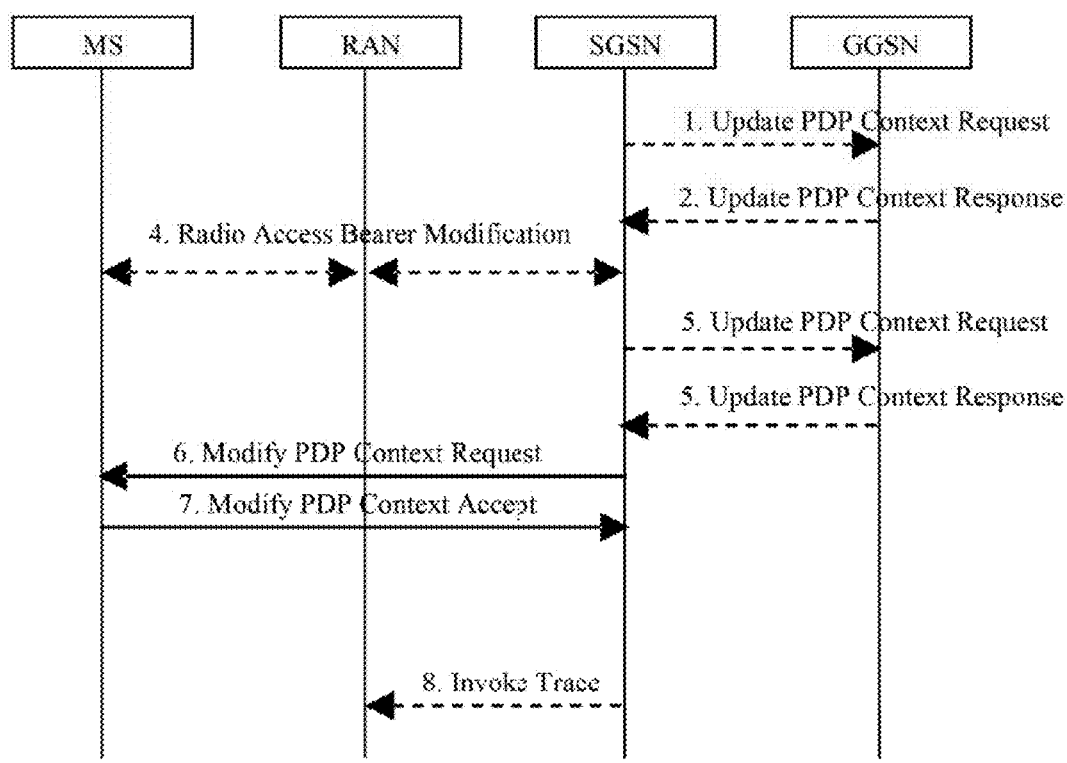

FIGS. 3C and 3D illustrate the communication of UPCON related PCC information, from a GGSN to a RAN node, during a PDP context modification procedure. The PDP Context Modification Procedure for A/Gb mode (FIG. 3C) and the PDP Context Modification Procedure for Iu mode (FIG. 3D) is further described in 3GPP Technical Specification (TS) 23.060 Section 9.2.3. In particular the GGSN may communicate the UPCON related PCC information to the RAN node during the PDP Context Modification procedure for the UTRAN/GERAN access case.

According to FIG. 3C, the UPCON related PCC information may be communicated to the RAN node during steps 2 and 3. At step 1, the SGSN may communicate an Update PDP Context Request message to the GGSN. At step 2, the GGSN may communicate an Update PDP Context Response message to the GGSN. In addition, the GGSN may communicate the UPCON related PCC information to the SGSN. At step 3, BSS packet flow context procedures may be executed between the RAN node and the SGSN. In addition, the UPCON related PCC information may be communicated to the RAN node. At step 5, the SGSN may communicate an Update PDP Context Request message to the GGSN in order to indicate a new QoS profile. The GGSN may confirm the new QoS profile by communicating an Update PDP Context Response message to the SGSN. At step 6, the SGSN may communicate a Modify PDP Context Request message to the MS. At step 7, the MS may communicate a Modify PDP Context Accept message to the SGSN. At step 8, the SGSN may communicate an Invoke Trace message to the RAN node.

According to FIG. 3D, the UPCON related PCC information may be communicated to the RAN node during steps 2 and 3. At step 1, the SGSN may communicate an Update PDP Context Request message to the GGSN. At step 2, the GGSN may communicate an Update PDP Context Response message to the GGSN. In addition, the GGSN may communicate the UPCON related PCC information to the SGSN. At step 4, Radio Access Bearer (RAB) Modification may be performed using a RAB Assignment procedure. In particular, RAB Modification may be performed between the RAN node and the SGSN, as well as between the MS and the RAN node. When the RAB Modification is being performed between the SGSN and the RAN node, the UPCON related PCC information may be communicated to the RAN node. At step 5, the SGSN may communicate an Update PDP Context Request message to the GGSN in order to indicate a new QoS profile. The GGSN may confirm the new QoS profile by communicating an Update PDP Context Response message to the SGSN. At step 6, the SGSN may communicate a Modify PDP Context Request message to the MS. At step 7, the MS may communicate as Modify PDP Context Accept message to the SGSN. At step 8, the SGSN may communicate an Invoke Trace message to the RAN node.

In one example, the RAN node (e.g., the eNB, the RNC, the BSS) may receive the UPCON related PCC information from the PCRF. The UPCON related PCC information may include UPCON event triggers. The UPCON event triggers may include UPCON at radio uplink. UPCON at radio downlink, UPCON at network uplink, and UPCON at network downlink. When one of the UPCON triggers is matched, the RAN node may report the UPCON event and related Radio Access Network Congestion Information (RCI) to the core network (CN). In addition, the RAN may report the RCI to one or more CN nodes, such as the MME, S-GW, P-GW, PCRF, etc. The RAN node may report the UPCON event and the RCI to the CN elements either directly or indirectly.

In one configuration, the RCI may include a congested interface node and direction. For example, the RCI may indicate congestion at radio interface downlink (e.g., LTE-Uu, Uu), radio interface uplink, network interface downlink (e.g., Gb, lu-Ps, S1-U), and network interface uplink. In addition, the RCI may indicate congestion at a particular RAN node, such as the eNB, RNC, or BSS.

The RCI may include a congestion severity level. The congestion severity level may be a predefined number that indicates the severity of the congestion. For example, the congestion severity level may range from 0 to 7, wherein 0 may indicate greater congestion severity and 7 may indicate lessor congestion severity, or vice versa. In addition, the RCI may include a congestion situation. The congestion situation may indicate whether congestion exists or whether congestion does not exist. For example, 0 may indicate that there is no congestion and 1 may indicate that there is congestion.

The RCI may include congestion location information. For example, the RCI may include a cell identifier (ID) to identify a location of congestion. The RCI may include a PDP context identifier (ID) or an evolved packet service (EPS) bearer identifier for the interface between the CN nodes. The RCI may include a user identity, such as an International Mobile Subscriber Identity (IMSI) Network Access Identifier (NAI) for an interface between the CN nodes, an eNB UE S1 Access Point (AP) identifier, or an MME HE S1AP identifier for a S1-MME interface. In addition, the RCI may include a UE identity, such as an International Mobile station Equipment Identity (MEI), for the interface between the CN nodes. The RCI may also include a PDN Connection Identifier, such as an APN, a PDN type, and a UE Internet Protocol UP) address for the interface between the CN nodes.

The RCI may include the User identity, the APN, or the EPS bearer ID to indicate that a particular UE, a particular APN, or a particular EPS bearer ID, respectively, is experiencing UPCON. For example, the RCI may include the APN that is experiencing UPCON when the UPCON event trigger is provisioned for APN based granularity reporting. In addition, the RCI may include the identity of a UE that is experiencing. UPCON when the UPCON event trigger is provisioned for UE based granularity reporting. Furthermore, the RCI may include an identifier for an EPS bearer that is experiencing UPCON when the UPCON event trigger is provisioned for bearer based granularity reporting.

After detecting the UPCON event based on the UPCON event triggers, the RAN node (e.g., the eNB) may report the UPCON event and the RCI to a Policy and Charging Rules Function (PCRF) node and optionally to an application server (AS). The eNB may report the UPCON event and the RCI, in an Evolved Packet System (EPS) for an E-UTRAN case, based on at least one of: (1) a direct communication between the eNB and the PCRF node; (2) a communication between the eNB and the PCRF node via an UPCON function entity (UPCON-FE); (3) a communication between the eNB and the PCRF node on a Control Plane via a Mobility Management Entity (MME), a Serving Gateway (SGW), and a Packet Data Network Gateway/Policy and Charging Enforcement Function node (PGW/PCEF); or (4) a communication between the eNB and the PCRF on a User Plane via a Serving Gateway (SGW), and a Packet Data Network Gateway Policy Charging Enforcement Function node (PGW/PCEF).

In one configuration, the RAN node may include a Universal Terrestrial Radio Access Network (UTRAN) or a Global System for Mobile Communications (GSM) Enhanced Data rates for GSM Evolution (EDGE) Radio Access Network (GERAN). The RAN node (i.e., the UTRAN/GERAN) may report the UPCON event and the RCI. In a 2G/3G system, based on at least one of: (1) as direct communication between the UTRAN or the GERAN and the PCRF node; (2) a communication between the UTRAN or the GERAN and the PCRF node via an UPCON function entity (UPCON-FE); (3) a communication between the UTRAN or the GERAN and the PCRF node on a Control Plane or a Use Plane via a SGSN, and a GGSN/Policy and Charging Enforcement Function node (GGSN/PCEF); or (4) a communication between the UTRAN or the GERAN and the PCRF node on the Control Plane or the User Plane via a S4-SGSN. Serving Gateway (SGW) and a Packet Data Network Gateway Policy Charging Enforcement Function node (PGW/PCEF).

In one example, the PCRF, after receiving the RCI from the RAN node, may report the RCI to the application server. An Rx interface may be used to communicate the RCI report from the PCRF to the application server. The application server may reduce the UPCON by performing at least one of indicating the UPCON event, reducing a maximum bitrate, reducing a bitrate CODEC, providing audio data with reduced bitrate video data, or removing video data. The application server may adjust the QoS by setting a maximum bitrate (e.g., 1 Mbps). As a result, the application server may reduce UPCON in a cell according to operator policies.

Figure 4A:
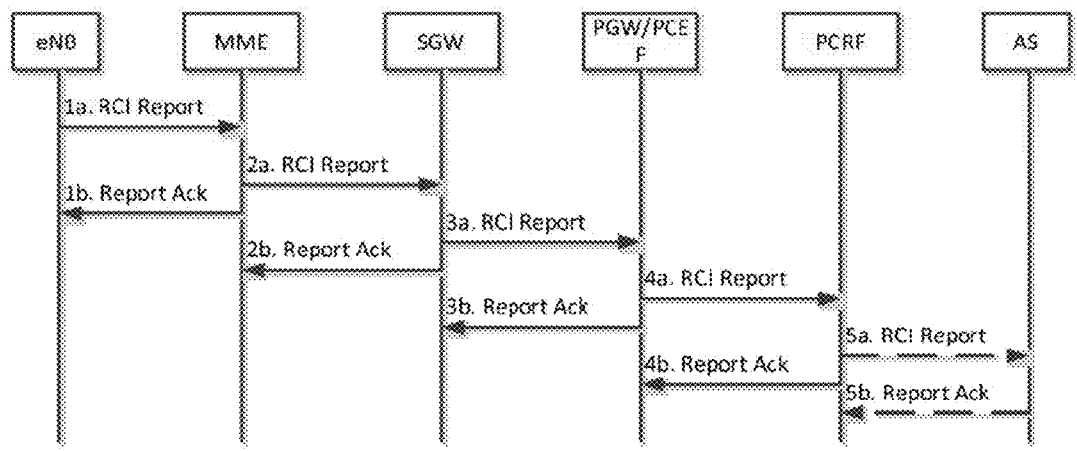
FIG. 4A illustrates the communication of a radio access network congestion information (RCI) report, from an eNB to a PCRF, via a Mobility Management Entity (MME), a Serving Gateway (SCANT), and a Packet Data Network Gateway Policy and Charging Enforcement Function node (PGW/PCEF) in accordance with an example.

FIG. 4A illustrates the reporting of radio access network congestion information (RCI), from an eNB to a PCRF, for the E-UTRAN case. In particular, the RCI may be reported via a Mobility Management Entity (MME), a Serving Gateway (SGW), and a Packet Data Network Gateway/Policy and Charging Enforcement Function node (PGW/PCEF). In particular, the eNB may report the RCI to the PCRF using the S1-MME, S11. S5/S8 and Gx paths. The S1-MME path may connect the eNB and the MIME, the S11 path may connect the MME and the S-GW, the S5/S8 path may connect the S-GW and the P-GW/PCEF, and the Gx path may connect the P-GW/PCEF and the PCRF. The PCRF may optionally communicate the RCI report to the application server.

As previously discussed, the RCI (or RCI report) may include a congested interface direction, a congestion severity level, a congestion situation, congestion location information, a UE identifier, a user identifier, a packet data network (PDN) connection identifier (ID), such as an access point name (APN) or one or more user equipment (UE) Internet Protocol (IP) addresses, a packet data protocol (PDP) context identifier, or an evolved packet system (EPS) bearer identifier. Thus, the RCI report may include RCI for the per UE, per APN, and per bearer cases. In one example, the MME, the S-GW, the P-GW/PCEF, the PCRF, and the AS may communicate an acknowledgement report to the respective CN node that directly communicated the last sent RCI report (e.g., the MME may communicate an acknowledgement report to the eNB). In addition, when the P-GW/PCEF and/or the PCRF becomes aware that UPCON is occurring, an IPCAN session modification procedure may be initiated in order to deal with the candidate UEs, APNs, and/or bearers, as described in 3GPP TS 23.203 Section 7.4.

Figure 4B:
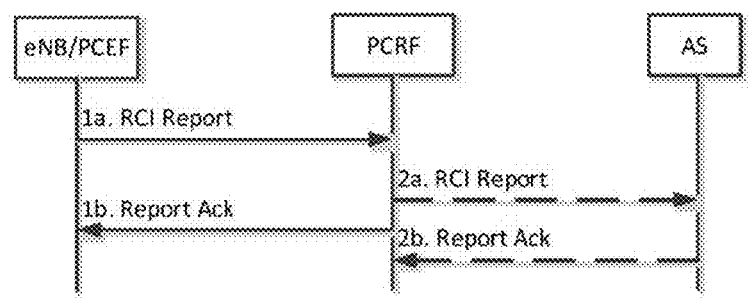
FIG. 4B illustrates the communication of a RC report from an eNB directly to a PCRF in accordance with an example.

FIG. 4B illustrates the reporting of RCI from an eNB to a PCRF for the E-UTRAN case. In particular, the PCEF may be enforced on the eNB. The eNB may directly communicate the RCI report to the PCRF via the Gx interface. In one example, the PCRF may communicate an acknowledgement report to the eNB/PCEF after receiving the RCI report from the eNB/PCEF. The PCRF may optionally communicate the RCI report to the application server. As previously discussed, the RCI (or RCI report) may include a congested interface direction, a congestion severity level, a congestion situation, congestion location information, a UE identifier, a user identifier, a packet data network (PDN) connection identifier (ID), such as an access point name (APN) or one or more user equipment (UE) Internet Protocol (IP) addresses, a packet data protocol (PDP) context identifier, or an evolved packet system (EPS) bearer identifier. Thus, the RCI report may include the RCI for the per UE, per APN, and per bearer cases.

Figure 4C:
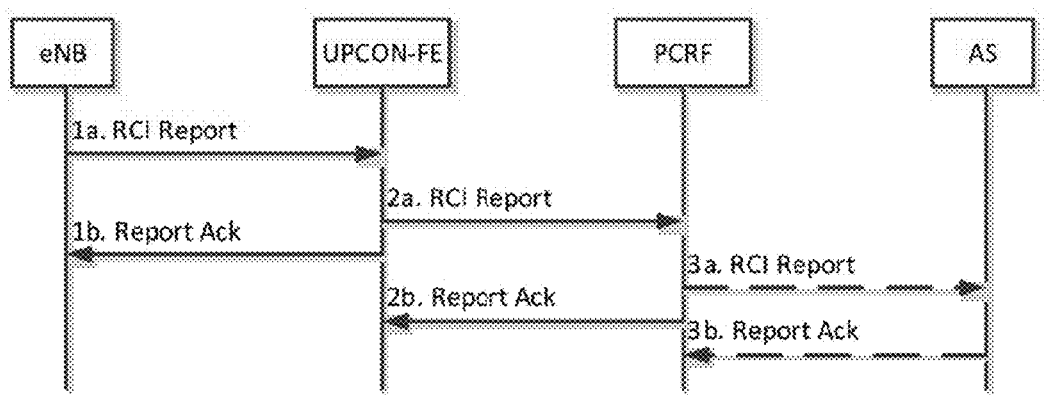
FIG. 4C illustrates the communication of a RCI report, from an eNB to a PCRF, via an UPCON function entity (UPCON-FE) in accordance with an example.

FIG. 4C illustrates the reporting of RCI, from an eNB to a PCRF, via an UPCON function entity (UPCON-FE) for the E-UTRAN case. The UPCON-FE may be a logical function entity that receives the RCI from the RAN node (e.g., the eNB), either directly or indirectly, and then communicates the RCI report to the PCRF. The UPCON-FE may receive the RCI indirectly via an Operation and Maintenance (O&M) node or CN nodes, such as the MME, SGSN, S-GW, PGW, SGSN, etc. The UPCON-FE may be a standalone entity or may be collocated with the MME/SGSN or other network elements. The UPCON-FE may discover the assigned PCRF based on a known user identity and APN, and then further communicate the RCI report to the PCRF in order to trigger a policy modification decision. The PCRF may optionally communicate the RCI report to the application server. As previously discussed, the RCI (or RCI report) may include a congested interface direction, a congestion severity level, a congestion situation, congestion location information, a UE identifier, a user identifier, a packet data network (PDN) connection identifier (ID), such as an access point name (APN) or one or more user equipment (UE) Internet Protocol (IP) addresses, a packet data protocol (PDP) context identifier, or an evolved packet system (EPS) bearer identifier. Thus, the RCI report may include the RCI for the per UE, per APN, and per bearer cases. In one example, an acknowledgement report may be communicated by a network node after receiving the RCI from a different network node (e.g., the UPON-FE may communicate an acknowledgement report to the eNB after receiving the RCI report from the eNB).

Figure 5A:
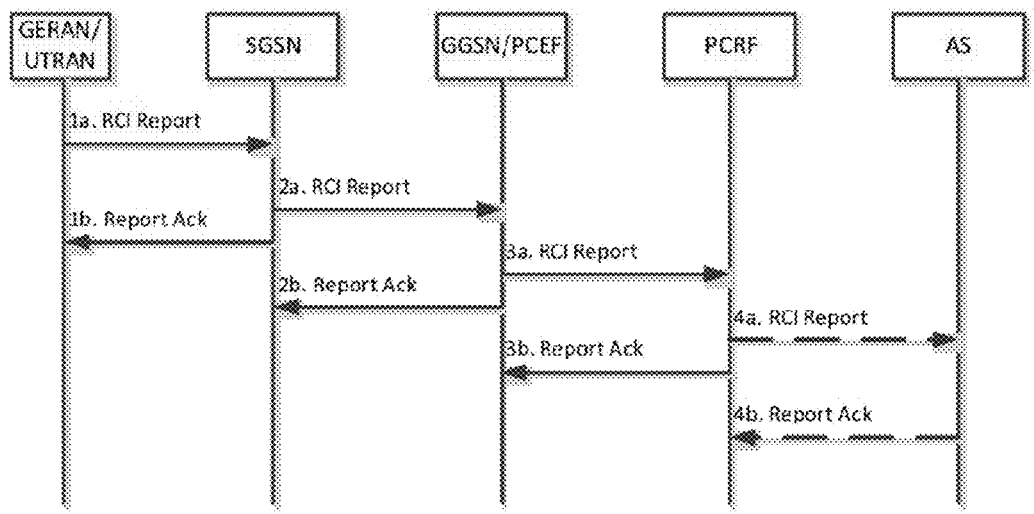
FIG. 5A illustrates the communication of a RCI report, from a Universal Terrestrial Radio Access Network (UTRAN) or a Global System for Mobile Communications (GSM) Enhanced Data rates for GSM Evolution (EDGE) Radio Access Network (GERAN) to a PCRF, via a Serving GPRS Support Node (SGSN) and a GGSN/PCEF in accordance with an example.

FIG. 5A illustrates the reporting of RCI, from a Universal Terrestrial Radio Access Network (UTRAN) or a Global System for Mobile Communications (GSM) Enhanced Data rates for GSM Evolution (EDGE) Radio Access Network (GERAN) to a PCRF. In particular, the GERAN/UTRAN may communicate the RCI to the PCRF, via a Serving GPRS Support Node (SGSN) and a GGSN/PCEF. The PCRF may optionally communicate the RCI report to the application server. In one example, an acknowledgement report may be communicated by a network node after receiving the RCI from a different network node. In addition, the RCI report may include, among other information, the RCI for the per UE, per APN, and per bearer cases.

Figure 5B:
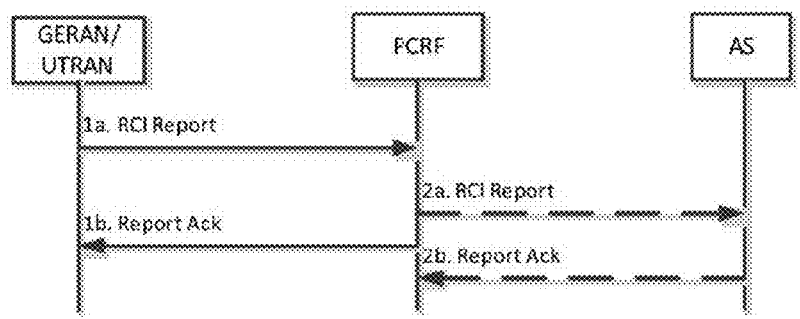
FIG. 5B illustrates the communication of a RCI report, from a UTRAN or a GERAN to a PCRF in accordance with an example.

FIG. 5B illustrates the direct reporting of RCI, from a UTRAN/GERAN to a PCRF. The PCRF may optionally communicate the RCI report to the application server. In one example, an acknowledgement report may be communicated by a network node after receiving the RCI from a different network node. In addition, the RCI report may include, among other information, the RCI for the per UE, per APN, and per bearer cases.

Figure 5C:
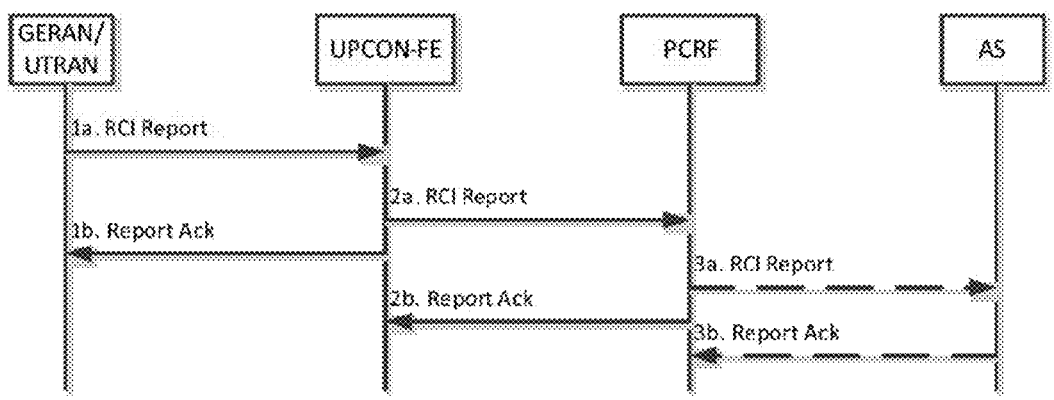
FIG. 5C illustrates the communication of a RCI report, from a UTRAN or a GERAN to a PCRF via an UPCON-FE in accordance with an example.

FIG. 5C illustrates the reporting of RCI, from a UTRAN/GERAN to a PCRF, via an UPCON-FE. The PCRF may optionally communicate the RCI report to the application server. In one example, an acknowledgement report may be communicated by a network node after receiving the RCI from a different network node. In addition, the RCI report may include, among other information, the RCI for the per UE, per APN, and per bearer cases.

Figure 6:
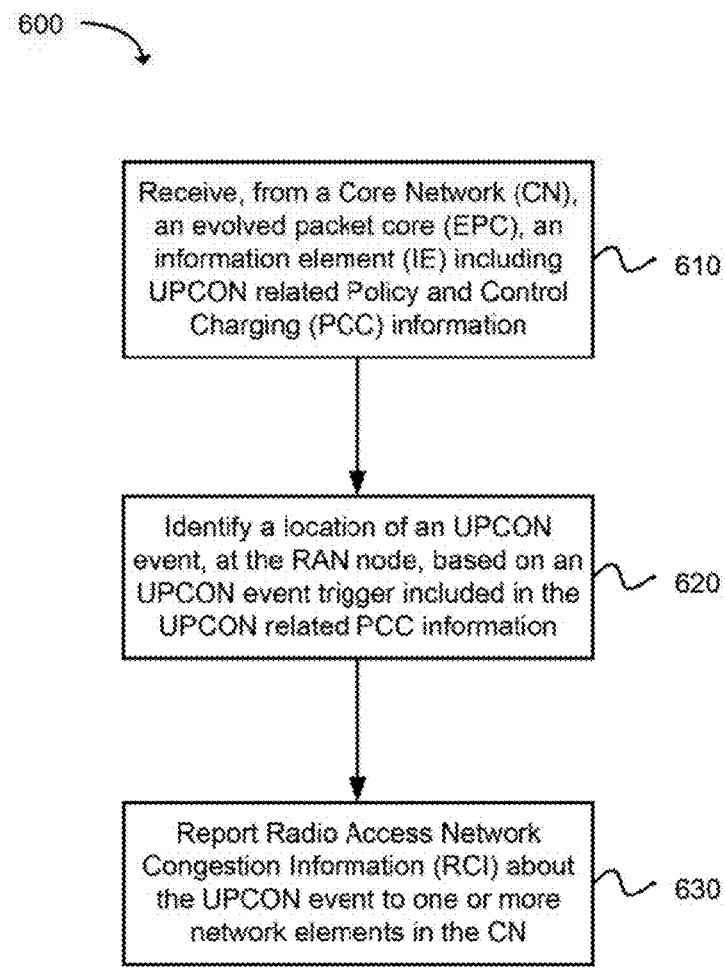
FIG. 6 depicts functionality of computer circuitry of a RAN node operable to report UPCON in accordance with an example.

Another example provides functionality 600 of computer circuitry of a radio access network (RAN) node operable to report user plane congestion (UPCON), as shown in the flow chart in FIG. 6. The functionality may be implemented as a method or the functionality may be executed as instructions on a machine, where the instructions are included on at least one computer readable medium or one non-transitory machine readable storage medium. The computer circuitry can be configured to receive, from a Core Network (CN), an evolved packet core (EPC), an information element (IE) including UPCON related Policy and Control Charging (PCC) information, as in block 610. The computer circuitry can be further configured to identify a location of an UPCON event, at the RAN node, based on an UPCON event trigger included in the UPCON related PCC information, as in block 620. The computer circuitry can also be configured to report Radio Access Network Congestion Information (RCI) about the UPCON event to one or more network elements in the CN, as in block 630.

As previously discussed, upon receiving the RCI report from the PCRF, the application server may reduce the UPCON by performing at least one of indicating the UPCON event, reducing a maximum bitrate, reducing a bitrate CODEC, providing audio data with reduced bitrate video data, or removing video data. The application server may adjust the QoS by setting a maximum bitrate (e.g., 1 Mbps). As a result, the application server may reduce UPCON in a cell according to operator policies.

In one configuration, the computer circuitry may be configured to receive the UPCON related PCC information, from a Policy and Charging Rules Function (PCRF) node in an Evolved Packet System (EPS), during at least one of: an attach procedure, a dedicated bearer activation procedure, a dedicated bearer modification procedure, or a user equipment (UE) requested packet data network (PDN) connectivity procedure. The computer circuitry may also be configured to receive the UPCON related PCC information from the Policy and Charging Rules Function (PCRF) node via a Gx interface.

In one example, the computer circuitry may be configured to identify the location of the UPCON event based on the UPCON event trigger identifying the location of the UPCON as occurring at: a radio uplink, a radio downlink, RAN node processing capability, a network uplink, or a network downlink.

In one configuration, the computer circuitry may be configured to report the RCI to a Policy and Charging Rules Function (PCRF) node in an Evolved Packet System (EPS) based on at least one of: a direct communication between the eNB and the PCRF node: a communication between the eNB and the PCRF node via an UPCON function entity (UPCON-FE); a communication between the eNB and the PCRF node on a Control Plane via a Mobility Management Entity (MME), a Serving Gateway (SGW), and a Packet Data Network Gateway/Policy and Charging Enforcement Function node (PGW/PCEF); or a communication between the eNB and the PCRF on a User Plane via a Serving Gateway (SGW), and a Packet Data Network Gateway/Policy Charging Enforcement Function node (PGW/PCEF).

In one example, the computer circuitry may be configured to report the RCI to an application server (AS) via the PCRF, wherein the AS reduces the UPCON by performing at least one of: indicating the UPCON event, reducing a maximum bitrate, reducing a bitrate CODEC, providing audio data with reduced bitrate video data, or removing video data.

In one configuration, the computer circuitry may be configured to receive, via the UPCON related PCC information, the UPCON event trigger for each UE during the attach procedure. The computer circuitry may be configured to receive, via the UPCON event trigger for each access point name (APN) during at least one of the attach procedure or the UE requested PDN connectivity procedure. The computer circuitry may also be configured to receive, via the UPCON event trigger for each evolved packet system (EPS) bearer during at least one of the dedicated bearer activation procedure or the dedicated bearer modification procedure.

In one configuration, the computer circuitry may be configured to receive, from the Policy and Charging Rules Function (PCRF), an information element (IE) that contains an UPCON reporting event trigger, a congested user equipment aggregated maximum bitrate (UE-AMBR) and an uncongested UE-AMBR per user equipment (UE). The computer circuitry may also be configured to receive, from the Policy and Charging Rules Function (PCRF), an information element (IE) that contains an UPCON reporting event trigger, a congested access point name aggregated maximum bitrate (APN-AMBR) and an uncongested APN-AMBR per access point name (APN). The computer circuitry may also be configured to receive, from the Policy and Charging Rules Function (PCRF), an information element (IE) that contains an UPCON reporting event trigger, a congested bearer maximum bitrate (BMBR) and an uncongested BMBR per evolved packet system (EPS) bearer.

In one example, the computer circuitry may be configured to send a RCI report to the CN, wherein the RCI report includes at least one of: a congested interface direction, a congestion severity level, a congestion situation, congestion location information, a UE identifier, a user identifier, a packet data network (PDN) connection identifier (ID), such as an access point name (APN) or one or more user equipment (UE) Internet Protocol (IP) address, a packet data protocol (PDP) context identifier, or an evolved packet system (EPS) bearer identifier.

Figure 7:
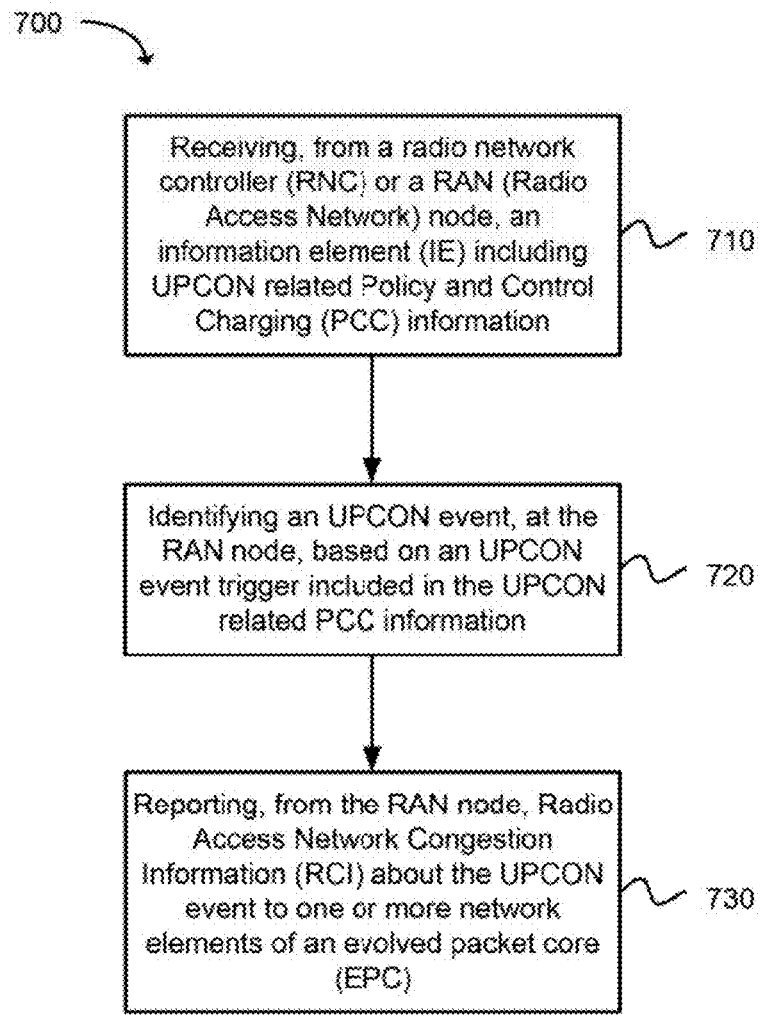
FIG. 7 depicts a flowchart of a method for reporting UPCON in accordance with an example.

Another example provides a method 700 for reporting user plane congestion (UPCON), as shown in the flow chart in FIG. 7. The method may be executed as instructions on a machine, where the instructions are included on at least one computer readable medium or one non-transitory machine readable storage medium. The method may include the operation of receiving, from a radio network controller (RNC) or a RAN (Radio Access Network) node, an information element (IE) including UPCON related Policy and Control Charging (PCC) information, as in block 710. The method may include identifying an UPCON event, at the RAN node, based on an UPCON event trigger included in the UPCON related PCC information, as in block 720. The next operation of the method may include reporting, from the RAN node. Radio Access Network Congestion Information (RCI) about the UPCON event to one or more network elements of an evolved packet core (EPC), as in block 730.

In one example, the method may include reporting the RCI about the UPCON event from a Universal Terrestrial Radio Access Network (UTRAN) or a Global System for Mobile Communications (GSM) Enhanced Data rates for GSM Evolution (EDGE) Radio Access Network (GERAN). In addition, the method may include receiving the UPCON related PCC information from a Gateway General Packet Radio Service (GPRS) Support. Node (GGSN) via a Serving GateWay (S-GW), a Serving GPRS Support Node (SGSN), or a S4-SGSN.

In another example, the method may include receiving, from a Gateway General Packet Radio Service (GPRS) Support Node (GGSN) in a 2G/3G system, the UPCON related PCC information during at least one: a packet data protocol (PDP) context activation procedure, or a PDP context modification procedure.

In an additional example, the method may include reporting the RCI, from the UTRAN or the GERAN, to a Policy and Charging Rules Function (PCRF) node based on at least one of: a direct communication between the UTRAN or the GERAN and the PCRF node; a communication between the UTRAN or the GERAN and the PCRF node via an UPCON function entity (UPCON-FE); a communication between the UTRAN or the GERAN and the PCRF node on a Control Plane or a User Plane via a SGSN, and a GGSN/Policy and Charging Enforcement Function node (GGSN/PCEF); or a communication between the UTRAN or the GERAN and the PCRF node on the Control Plane or the User Plane via a S4-SGSN, a Serving Gateway (SGW) and a Packet Data Network Gateway/Policy Charging Enforcement Function node (PGW/PCEF).

In one example, the UPCON-FE may be configured to receive the RCI from the RAN node and a core network node; determine an assigned PCRF for each impacted user equipment (UE) and an Internet Protocol Connectivity Access Network (IP-CAN) session based on user identities and packet data network (PDN) connection identifiers included in the RCI; and report the RCI to the assigned PCRF.

In addition, the method may include reporting the RCI, from the UTRAN or the GERAN to an application server (AS) via the PCRF, wherein the AS reduces the UPCON by performing at least one of: indicating the UPCON event, reducing a maximum bitrate, reducing a bitrate CODEC, providing audio data with reduced bitrate video data, or removing video data.

Figure 8:
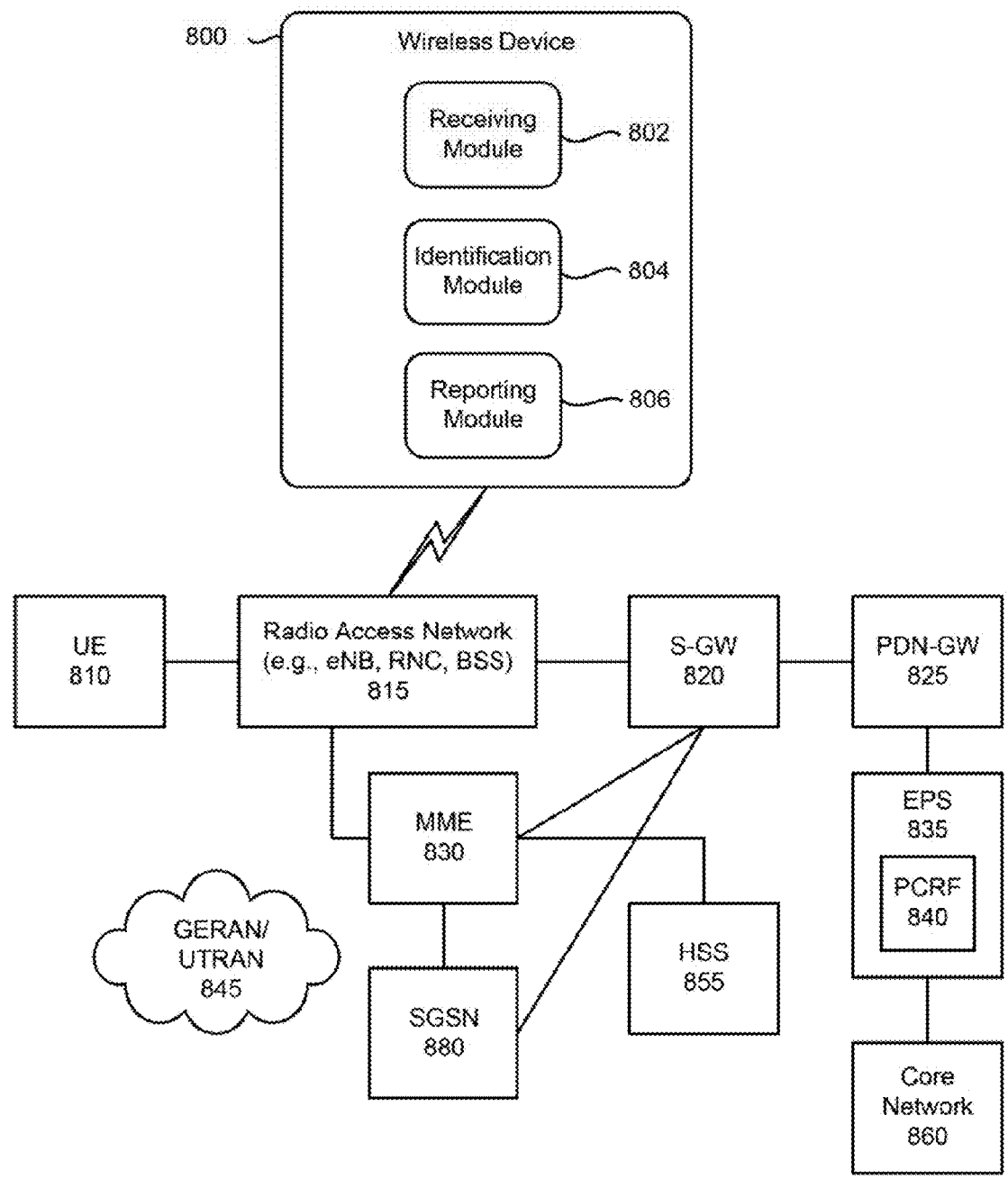
FIG. 8 illustrates a block diagram of an UPCON reporting device that is coupled to a RAN node in accordance with an example.

FIG. 8 illustrates an example user plane congestion (UPCON) reporting device 800 that is coupled to a radio access network (RAN) 810, as shown in other embodiments of the present invention. The RAN 810 may include an eNB, RNC, or BSS. The UPCON reporting device comprises a receiving module 802 configured to receive, at the RAN node, an information element (IE) including UPCON related Policy and Control Charging (PCC) information. An identification module 804 can be configured to identify, at the RAN node, a location of an UPCON event based on an UPCON event trigger included in the UPCON related PCC information. A reporting module 806 can be configured to report, at the RAN node, RAN Congestion Information (RCI) about the UPCON event to one or more network elements in a Core Network (CN) 860.

In one example, the receiving module 802 can be further configured to receive the UPCON related PCC information, from a Policy and Charging Rules Function (PCRF) node 840 in an Evolved Packet System (EPS) 835, during at least one of an attach procedure, a dedicated bearer activation procedure, a dedicated bearer modification procedure, or a user equipment (UE) requested packet data network (PDN) connectivity procedure.

In one configuration, the identification module 804 can be further configured to identify the location of the UPCON event based on the UPCON event trigger identifying the location of the UPCON as occurring at: a radio uplink, a radio downlink, RAN node processing capability, a network uplink, or a network downlink.

In one example, the reporting module 806 can be configured to report the RCI to a Policy and Charging Rules Function (PCRF) node 840 in an Evolved Universal Terrestrial Radio Access Network (E-UTRAN) based on at least one of: a direct communication between the eNB and the PCRF node 840; a communication between the eNB and the PCRF node via an UPCON function entity (UPCON-FE); a communication between the eNB 815 and the PCRF node 840 on a Control Plane via a Mobility Management Entity (MME) 830, a Serving Gateway (SGW) 820, and a Packet Data Network Gateway/Policy and Charging Enforcement Function node 825 (PGW/PCEF); or a communication between the eNB and PCRF 840 on a User Plane via a Serving Gateway (SGW) 820, and a Packet Data. Network Gateway Policy Charging Enforcement Function node (PGW/PCEF) 825.

In addition, the reporting module 806 can be configured to report the RCI to an application server (not shown) via the PCRF 840, wherein the AS reduces the UPCON by performing at least one of: indicating the UPCON event, reducing a maximum bitrate, reducing a bitrate CODEC, providing audio data with reduced bitrate video data, or removing video data.

Figure 9:
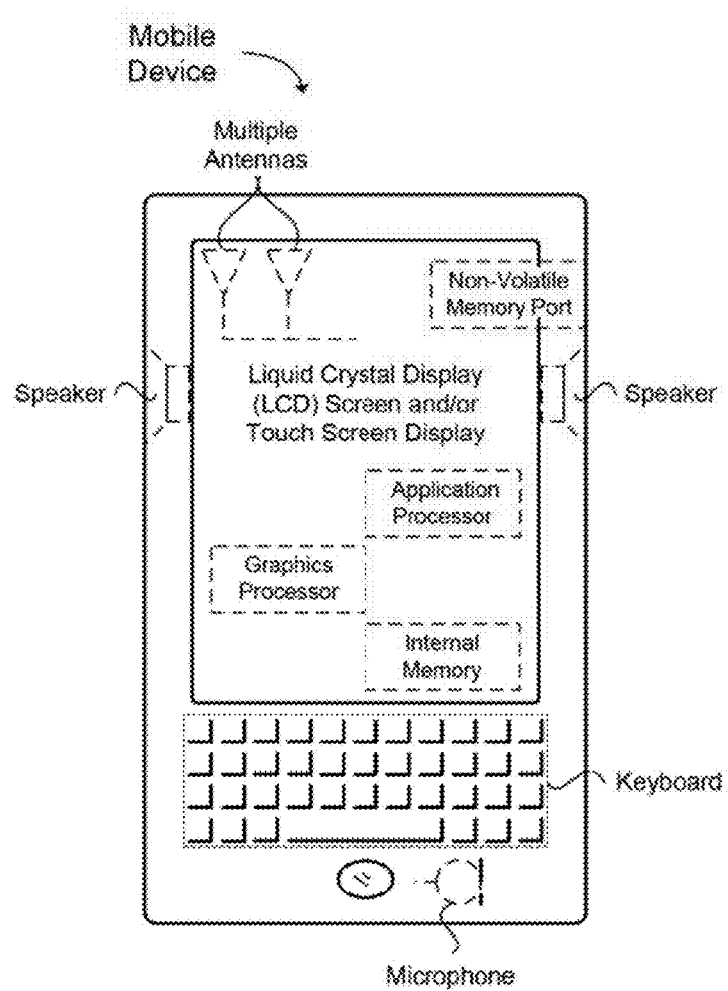
FIG. 9 illustrates a diagram of a wireless device (e.g., UE) in accordance with an example.

FIG. 9 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 9 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes. CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the an that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A non-transitory machine readable storage medium having instructions embodied thereon, the instructions which when executed by one or more processors perform the following:
   identifying, at a radio access network (RAN) node, RAN user plane congestion (UPCON) information (RUCI) received from an operations and maintenance (OAM) system in the RAN; and
   providing the RUCI from the RAN node to a policy and charging rules function (PCRF) in a core network (CN) via a mobility management entity (MME),
   wherein the RUCI is provided from the RAN node to the PCRF that is serving a packet data network (PDN) connection for a user equipment (UE) that is impacted by the UPCON,
   wherein the RUCI includes:
   an access point name (APN) for which the UPCON is reported; and
   a congestion level for a particular evolved universal terrestrial radio access network (EUTRAN) cell impacted by the UPCON,
   wherein the RUCI enables the PCRF to perform a policy decision using the RUCI to reduce UPCON at the RAN node.

2. The non-transitory machine readable storage medium of claim 1, further comprising instructions which when executed by the one or more processors perform the following: providing the RUCI from the RAN node to the PCRF via a functional element.

3. The non-transitory machine readable storage medium of claim 1, further comprising instructions which when executed by the one or more processors perform the following: providing the RUCI from the RAN node to the PCRF via a functional element or the MME.

4. The non-transitory machine readable storage medium of claim 1, wherein the RUCI provided from the RAN node to the PCRF includes a congestion level for a particular evolved node B (eNB) impacted by the UPCON.

5. The non-transitory machine readable storage medium of claim 1, wherein the RUCI provided from the RAN node to the PCRF includes an identifier for the UE impacted by the UPCON.

6. The non-transitory machine readable storage medium of claim 1, further comprising instructions which when executed by the one or more processors perform the following: providing the RUCI from the RAN node to the PCRF to enable the PCRF to perform the policy decision based on at least one of a congestion level, an identifier of the UE, or an access point name (APN) that is included in the RUCI.

7. A radio access network (RAN) node having one or more processors configured to:
   identify RAN user plane congestion (UPCON) information (RUCI) received from an operations and maintenance (OAM) system in the RAN; and
   provide the RUCI from the RAN node to a policy and charging rules function (PCRF) in a core network (CN) via a mobility management entity (MME),
   wherein the RUCI is provided from the RAN node to the PCRF that is serving a packet data network (PDN) connection for a user equipment (UE) that is impacted by the UPCON,
   wherein the RUCI includes:

an access point name (APN) for which the UPCON is reported; and a congestion level for a particular evolved universal terrestrial radio access network (EUTRAN) cell impacted by the UPCON, wherein the RUCI enables the PCRF to perform a policy decision to reduce UPCON at the RAN node using the RUCI.

8. The RAN node of claim 7, wherein the one or more processors are further configured to provide the RUCI to the PCRF via a functional element.

9. The RAN node of claim 7, wherein the RUCI includes at least one of: a congestion level for a particular evolved universal terrestrial radio access network (EUTRAN) cell impacted by the UPCON, or an identifier for the UE impacted by the UPCON.

10. The RAN node of claim 7, wherein the one or more processors are further configured to provide the RUCI to the PCRF to enable the PCRF to perform the policy decision based on at least one of a congestion level, an identifier of the UE, or the APN that is included in the RUCI.

11. A method for facilitating policy decisions based on user plane congestion (UPCON), the method comprising:

identifying, at a radio access network (RAN) node, RAN user plane congestion (UPCON) information (RUCI) received from an operations and maintenance (OAM) system in the RAN; and providing the RUCI from the RAN node to a policy and charging rules function (PCRF) in a core network (CN) via a mobility management entity (MME), wherein the RUCI is provided from the RAN node to the PCRF that is serving a packet data network (PDN) connection for a user equipment (UE) that is impacted by the UPCON, wherein the RUCI includes:

an access point name (APN) for which the UPCON is reported; and a congestion level for a particular evolved universal terrestrial radio access network (EUTRAN) cell impacted by the UPCON, wherein the RUCI enables the PCRF to perform the policy decisions to reduce UPCON at the RAN node using the RUCI.

12. The method of claim 11, further comprising providing the RUCI from the RAN node to the PCRF via a functional element or the MME.

13. The method of claim 11, wherein the RUCI includes at least one of: a congestion level for a particular evolved universal terrestrial radio access network (EUTRAN) cell impacted by the UPCON, or an identifier for the UE impacted by the UPCON.

14. The method of claim 11, further comprising providing the RUCI to the PCRF to enable the PCRF to perform the policy decisions based on at least one of a congestion level, an identifier of the UE, or the APN that is included in the RUCI.

* * * * *